United States Patent
Kwon et al.

(10) Patent No.: US 10,129,002 B2
(45) Date of Patent: *Nov. 13, 2018

(54) APPARATUS AND METHOD FOR FEEDING BACK CHANNEL QUALITY INFORMATION AND SCHEDULING APPARATUS AND METHOD USING THE SAME IN A WIRELESS COMMUNICATION SYSTEM

(71) Applicant: Samsung Electronics Co., Ltd., Suwon-si, Gyeonggi-do (KR)

(72) Inventors: Hwan-Joon Kwon, Hwaseong-si (KR); Kyeong-In Jeong, Hwaseong-si (KR); Jin-Kyu Han, Seoul (KR); Dong-Hee Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

This patent is subject to a terminal disclaimer.

(21) Appl. No.: 14/867,582

(22) Filed: Sep. 28, 2015

(65) Prior Publication Data

US 2016/0020888 A1    Jan. 21, 2016

Related U.S. Application Data

(63) Continuation of application No. 14/036,089, filed on Sep. 25, 2013, now Pat. No. 9,467,268, which is a
(Continued)

(30) Foreign Application Priority Data

Aug. 29, 2005    (KR) .................. 10-2005-0079688

(51) Int. Cl.
*H04L 5/00*    (2006.01)
*H04B 7/06*    (2006.01)
(Continued)

(52) U.S. Cl.
CPC ......... *H04L 5/0057* (2013.01); *H04B 7/0689* (2013.01); *H04B 17/24* (2015.01);
(Continued)

(58) Field of Classification Search
CPC .................................................. H04L 1/0026
See application file for complete search history.

(56) References Cited

U.S. PATENT DOCUMENTS 7,388,847 B2    6/2008  Dubuc et al.
9,467,268 B2 *  10/2016 Kwon ................. H04B 7/0689
(Continued)

FOREIGN PATENT DOCUMENTS

CN          1524367 A         8/2004
KR     10-2004-0081060 A      9/2004
(Continued)

OTHER PUBLICATIONS

Samsung, Physical Channel Structure and Procedure for EUTRA Downlink, Agenda Item 10.4 of 3GPP TSG-RAN Meeting No. 42, London, UK, Aug. 29-Sep. 2, 2005.
(Continued)

*Primary Examiner* — Min Jung
(74) *Attorney, Agent, or Firm* — Jefferson IP Law, LLP

(57) ABSTRACT

An apparatus and method are provided for feeding back channel quality information and performing scheduling using the fed-back channel quality information in a wireless communication system based on Orthogonal Frequency Division Multiple Access (OFDMA). In the OFDMA wireless communication system, forward performance degradation due to a decrease in an amount of reverse channel quality information is reduced, and also an increase in the reverse load due to channel quality information feedback is suppressed. A base station controls power of a physical channel using information fed back from a mobile station. In
(Continued)

a method for feeding back channel quality information from the mobile station, sub-band-by-sub-band channel quality information is measured and channel-by-channel quality information of a number of channels is transmitted in order of sub-bands of better channel quality information. Average channel quality information for a total band is measured and transmitted.

20 Claims, 9 Drawing Sheets

Related U.S. Application Data continuation of application No. 13/315,464, filed on Dec. 9, 2011, now Pat. No. 8,565,328, which is a continuation of application No. 11/511,504, filed on Aug. 29, 2006, now Pat. No. 8,094,733.

(51) Int. Cl.
| | | |
|---|---|---|
| H04L 1/00 | (2006.01) | |
| H04L 27/26 | (2006.01) | |
| H04W 24/10 | (2009.01) | |
| H04W 52/24 | (2009.01) | |
| H04W 52/32 | (2009.01) | |
| H04W 72/12 | (2009.01) | |
| H04W 24/08 | (2009.01) | |
| H04W 72/04 | (2009.01) | |
| H04B 17/24 | (2015.01) | |
| H04B 17/26 | (2015.01) | |
| H04B 17/309 | (2015.01) | |
| H04B 17/30 | (2015.01) | |
| H04W 52/22 | (2009.01) | |
| H04B 17/327 | (2015.01) | |

(52) U.S. Cl.
CPC ............ *H04B 17/26* (2015.01); *H04B 17/30* (2015.01); *H04B 17/309* (2015.01); *H04L 1/0003* (2013.01); *H04L 1/0026* (2013.01); *H04L 5/0007* (2013.01); *H04L 5/0053* (2013.01); *H04L 27/2601* (2013.01); *H04W 24/08* (2013.01); *H04W 24/10* (2013.01); *H04W 52/247* (2013.01); *H04W 52/325* (2013.01); *H04W 72/0453* (2013.01); *H04W 72/1231* (2013.01); *H04W 72/1284* (2013.01); *H04B 17/327* (2015.01); *H04W 52/225* (2013.01)

(56) References Cited

U.S. PATENT DOCUMENTS

| | | | |
|---|---|---|---|
| 9,831,998 B2 * | 11/2017 | Kwon | ................... H04L 5/0057 |
| 2004/0179433 A1 | 9/2004 | Paratte | |
| 2004/0190648 A1 | 9/2004 | Anim-Appiah et al. | |
| 2004/0203979 A1 | 10/2004 | Attar et al. | |
| 2005/0025039 A1 | 2/2005 | Hwang et al. | |
| 2005/0031044 A1 | 2/2005 | Gesbert et al. | |
| 2005/0041622 A1 | 2/2005 | Dubuc et al. | |
| 2005/0128993 A1 * | 6/2005 | Yu | .......................... H04B 7/061 |
| | | | 370/342 |
| 2005/0174982 A1 | 8/2005 | Uehara et al. | |
| 2005/0191965 A1 | 9/2005 | Yu et al. | |
| 2005/0245258 A1 | 11/2005 | Classon et al. | |
| 2005/0281226 A1 | 12/2005 | Lee et al. | |
| 2006/0057965 A1 | 3/2006 | Braun et al. | |
| 2006/0234646 A1 | 10/2006 | Naguib et al. | |
| 2006/0274712 A1 * | 12/2006 | Malladi | .............. H04B 1/70735 |
| | | | 370/345 |
| 2007/0026810 A1 | 2/2007 | Love et al. | |
| 2007/0054689 A1 | 3/2007 | Baker et al. | |
| 2015/0312929 A1 * | 10/2015 | Kwon | .................. H04B 7/0689 |
| | | | 370/329 |

FOREIGN PATENT DOCUMENTS

| | | |
|---|---|---|
| RU | 2219665 C2 | 12/2003 |
| RU | 2258312 C2 | 2/2005 |
| WO | 0249305 A3 | 6/2002 |
| WO | 0249385 A2 | 6/2002 |

OTHER PUBLICATIONS

3GPP TR 25.824 Technical Specification Group Radio Access Network, Physical Layer Aspects for Evolved UTRA (Release 7) V0.1.2, Jun. 2005.

* cited by examiner

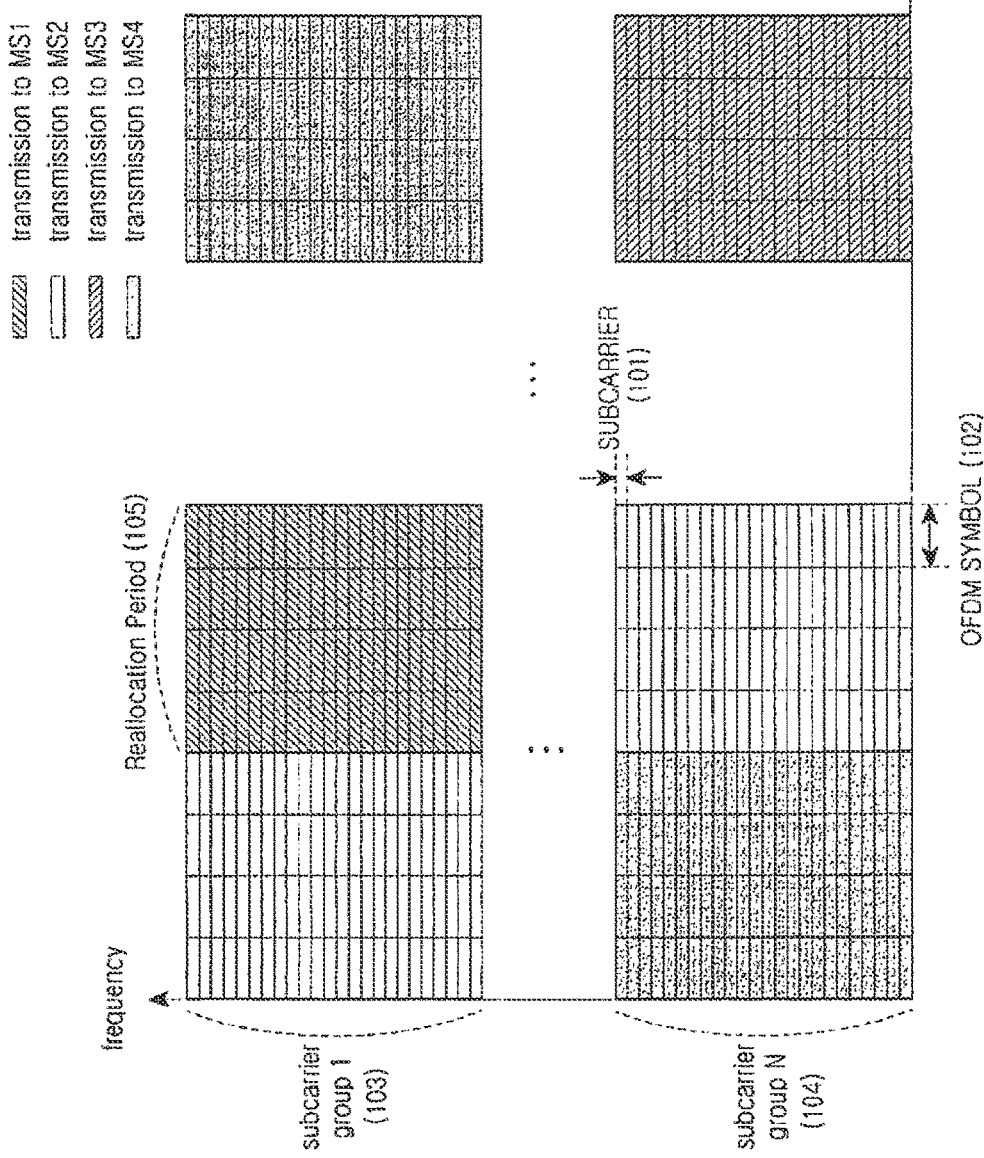

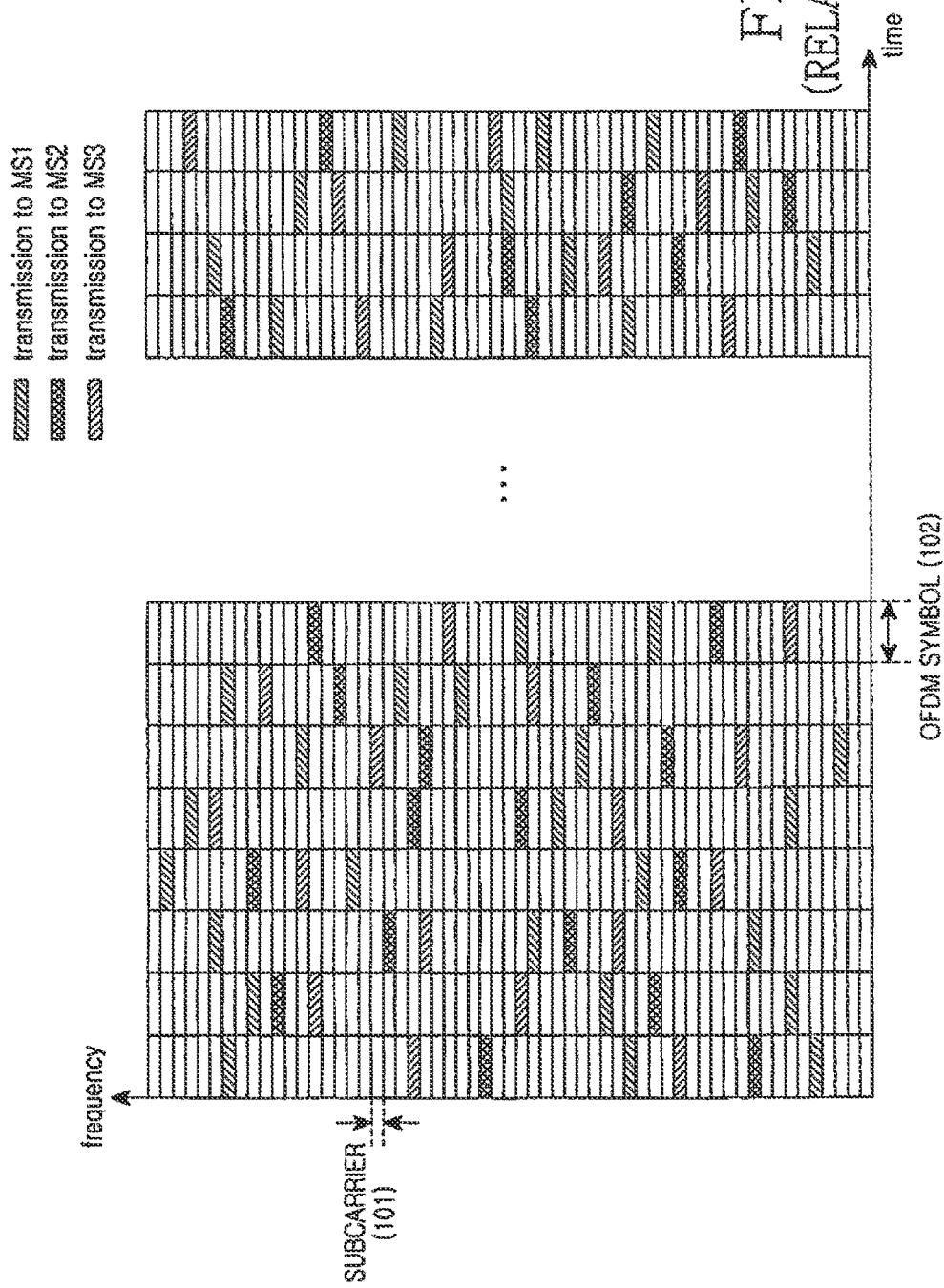

US 10,129,002 B2

APPARATUS AND METHOD FOR FEEDING BACK CHANNEL QUALITY INFORMATION AND SCHEDULING APPARATUS AND METHOD USING THE SAME IN A WIRELESS COMMUNICATION SYSTEM

CROSS-REFERENCE TO RELATED APPLICATION(S)

This application is a continuation application of prior application Ser. No. 14/036,089, filed on Sep. 25, 2013, which is a continuation application of prior application Ser. No. 13/315,464, filed on Dec. 9, 2011, which is a continuation application of prior application Ser. No. 11/511,504, filed on Aug. 29, 2006, which issued as U.S. Pat. No. 8,094,733 on Jan. 10, 2012, and claimed the benefit under 35 U.S.C. § 119(a) of a Korean patent application filed on Aug. 29, 2005, in the Korean Intellectual Property Office and assigned Serial number 10-2005-0079688, the entire disclosure of each of which is hereby incorporated by reference.

BACKGROUND OF THE INVENTION

Field of the Invention

The present invention generally relates to an apparatus and method for feeding back channel quality information and performing scheduling using the fed-back channel quality information in a wireless communication system. More particularly, the present invention relates to an apparatus and method for feeding back channel quality information and performing scheduling using the fed-back channel quality information in a wireless communication system based on Orthogonal Frequency Division Multiple Access (OFDMA).

Description of the Related Art

Conventionally, a wireless communication system performs communication through a radio channel between mobile stations (MSs) or between an MS and a base station (BS) of a predetermined network. The wireless communication system was initially developed to provide a voice service, but has been advanced to provide a data service in response to user requests. Technologies are needed which can efficiently transmit data due to an increase in an amount of data to be transmitted and an increase in the number of users. According to this need, wireless communication systems transmit user-by-user data by correctly detecting channel situations between the BS and the MSs.

In a method for detecting the channel situations between the BS and the MSs, each MS measures channel quality of a signal received from the BS and feeds back channel quality information or a channel quality indicator (CQI). For example, in a typical mobile communication system using Orthogonal Frequency Division Multiple Access (OFDMA), each MS measures the signal strength of a pilot channel received from the BS and transmits information about the measured strength to the BS. Then, the BS can detect a channel situation between the BS and an associate MS from the reception strength of the pilot channel. Thus, the BS efficiently transmits data by employing the detected channel situation for scheduling and power control of a forward transmission.

As described above, wireless communication systems are being developed into systems capable of accommodating an increased number of users and transmitting a large amount of data. However, the OFDMA mobile communication system based on the current voice service has a limitation in transmitting a large amount of data at a high rate. Thus, research is being actively conducted on other types of systems rather than the OFDMA system.

One system for transmitting a large amount of data at a high rate is a wireless communication system based on Orthogonal Frequency Division Multiplexing (OFDM). The OFDM is a type of Multi-Carrier Modulation (MCM) scheme for converting a serially input symbol stream, to be transmitted to a user, to parallel form, modulating parallel data in a plurality of orthogonal subcarriers, in other words, a plurality of subcarrier channels, and transmitting the subcarrier channels. A scheme for identifying multiple users through the OFDM is OFDMA. A method for configuring a channel to transmit one data packet in the OFDMA system is divided into an Adaptive Modulation & Coding (AMC) transmission scheme and a diversity transmission scheme. The AMC transmission scheme configures one physical channel by combining adjacent subcarriers and adjacent symbols, and is referred to as a localized transmission scheme. On the other hand, the diversity transmission scheme configures one physical channel by combining scattered subcarriers and is referred to as a distributed transmission scheme.

First, a method for allocating orthogonal frequencies to users and a transmission method in the OFDMA mobile communication system will be described with reference to the accompanying drawings.

FIG. 1A illustrates an example of allocating orthogonal frequency resources to users in the OFDMA mobile communication system, and FIG. 1B illustrates another example of allocating orthogonal frequency resources to users in the OFDMA mobile communication system.

In FIGS. 1A and 1B, the horizontal axis represents time and the vertical axis represents orthogonal frequencies. As illustrated in FIG. 1A, multiple orthogonal frequency resources can form one subcarrier group and subcarrier groups are allocated to one communication MS. Further, the subcarrier groups are transmitted during at least one OFDM symbol time. In FIGS. 1A and 1B, reference numeral 101 denotes one subcarrier and reference numeral 102 denotes one OFDM symbol. As illustrated in FIG. 1A, subcarrier groups 103, . . . , 104 are included in a reallocation period 105 for reallocating frequency resources.

An example of allocating frequency resources will be described with reference to FIGS. 1A and 1B.

FIG. 1A illustrates an example of transmitting data using AMC technology in the OFDMA system. As illustrated in FIG. 1A, a total frequency band is conventionally divided into N subcarrier groups or sub-bands in the OFDM system using AMC and performs AMC operations on a subcarrier group-by-subcarrier group basis. Hereinafter, one subcarrier group is referred to as one AMC sub-band. That is, Subcarrier Group 1 denoted by reference numeral 103 is referred to as "AMC Sub-Band 1", and Subcarrier Group N denoted by reference numeral 104 is referred to as "AMC Sub-Band N". In the conventional system, scheduling is performed in a unit of multiple OFDM symbols as indicated by reference numeral 105. As described above, the conventional OFDM system independently performs AMC operations on multiple AMC sub-bands. Thus, each MS feeds back CQI information on a sub-band-by-sub-band basis. The BS receives channel quality information of sub-bands to schedule the sub-bands and transmits user data on the sub-band-by-sub-band basis. In an example of the scheduling process, the BS selects MSs of the best channel qualities on the sub-band-by-sub-band basis and transmits data to the selected MSs, such that system capacity can be maximized.

According to characteristics of the above-described AMC operation, it can be seen that a good situation is the case where multiple subcarriers for transmitting data to one MS are adjacent to each other. This is because channel response strengths relating to adjacent subcarriers may be similar to each other but channel response strengths relating to far away subcarriers may be significantly different from each other when frequency selectivity occurs in a frequency domain due to a multipath radio channel. The above-described AMC operation maximizes system capacity by selecting subcarriers relating to good channel responses and transmitting data through the selected subcarriers. Therefore, it is preferred that a structure can select multiple adjacent subcarriers relating to good channel responses to transmit data through the selected adjacent subcarriers. The above-described AMC technology is suitable for a data transmission to a particular user. It is not preferred that channels to be transmitted to multiple users, for example, broadcast or common control information channels, are adapted to a channel state of one user.

FIG. 1B illustrates an example of transmitting user data using diversity technology in the OFDMA system. As illustrated in FIG. 1B, it can be seen that subcarriers carrying data to be transmitted to one MS are scattered, which is different from the AMC mode of FIG. 1A. The diversity transmission is suitable for the case where a transmission of a combination of data of one user in a particular sub-band is not easy because a data transmitter cannot know a channel state. The diversity transmission is also suitable for a channel to be transmitted to unspecified users as in broadcasting.

The above-described OFDMA wireless communication system conventionally transmits packet data. The system for transmitting the packet data has the structure of FIG. 2. FIG. 2 is a conceptual diagram illustrating a relation between a BS or Access Point (AP) and MSs or Access Terminals (ATs) in a wireless communication system for performing packet data communication.

Referring to FIG. 2, MSs or ATs 211, 212, 213, 214, and 215 communicate with the BS or AP 200 through a predetermined channel. The BS or AP 200 transmits a predetermined reference signal, for example, a pilot signal. The MSs or ATs 211~215 measure the strength of a signal received from the BS 200 and feed back information about the measured strength to the BS or AP 200, respectively. Thus, the BS or AP 200 performs scheduling using information about strengths of signals received from the MSs or ATs and transmits data to the MSs or ATs. In FIG. 2, the arrows from the BS or AP 200 to the MSs or ATs 211~215 are signals transmitted on forward channels and the arrows from the MSs or ATs 211~215 to the BS or AP 200 are signals transmitted on reverse channels.

As described with reference to FIG. 2, a mobile communication system for performing packet data communication widely employs a scheme in which an MS measures the quality of a forward channel and feeds back channel quality information to the BS, because a transmitter of the BS can easily select a suitable data transmission rate according to a channel state when knowing a forward channel state.

A scheme for feeding back forward channel quality information from an MS in the OFDMA mobile communication system will be described.

FIG. 3 is a timing diagram illustrating an operation for feeding back forward channel quality information from an MS in the OFDMA mobile communication system for performing packet data communication.

Referring to FIG. 3, blocks 301, 302, 303, and 304 indicate that the MS feeds back forward channel quality information in a block unit. The channel quality information is fed back during one feedback information transmission. In the OFDMA system, each MS conventionally feeds back a pair of a sub-band index and channel quality information. That is, a sub-band index and its mapped channel quality information are fed back such that sub-band-by-sub-band channel quality information is fed back. Because a large number of sub-bands are conventionally present in the OFDMA wireless communication system, severe reverse load occurs when channel quality information of all sub-bands is fed back. Thus, the MS conventionally selects several best sub-bands and feeds back sub-band indices and their channel quality information.

Because the number of sub-bands capable of being allocated from the BS to the MS is reduced when the number of feedback sub-bands is reduced, the forward performance is degraded. For example, when the MS selects only one sub-band and feeds back a sub-band index and its channel quality information to the BS, the BS can allocate only the sub-band selected by the MS. If the sub-band cannot be allocated to the MS, the forward performance for the MS is degraded.

When the number of feedback sub-bands increases, an increase in the reverse load is caused and therefore the reverse throughput is degraded. In contrast, when the number of feedback sub-bands decreases, the forward channel selectivity is reduced and therefore the forward performance is degraded. Thus, a need exists for an improved method capable of performing processing such that a relation between the reverse load and the forward channel selectivity is appropriately established.

SUMMARY OF THE INVENTION

Exemplary embodiments of the present invention address at least the above problems and/or disadvantages and provide at least the advantages described below. Accordingly, an exemplary object of the present invention is to provide an apparatus and method that can suppress the reverse load due to feedback while reducing the degradation of forward performance due to a decrease in quality information of a reverse channel in an Orthogonal Frequency Division Multiple Access (OFDMA) system.

It is another exemplary object of the present invention to provide an apparatus and method that can efficiently perform scheduling by suppressing the reverse load due to feedback while reducing the degradation of forward performance due to a decrease in quality information of a reverse channel in an OFDMA system.

It is yet another exemplary object of the present invention to provide an apparatus and method that can control power of a physical channel of a base station using information fed back from a mobile station.

In accordance with an exemplary aspect of the present invention, there is provided an apparatus for feeding back channel quality information from a mobile station in a wireless communication system based on Orthogonal Frequency Division Multiple Access (OFDMA), comprising a controller for measuring sub-band-by-sub-band channel quality information, generating channel-by-channel quality information of a number of channels in order of sub-bands with better channel quality information, and measuring and generating average channel quality information for a total band in the OFDMA wireless communication system, a modem for encoding and modulating information output from the controller and a transmitter for configuring information output from the modem in a physical channel, performing a band up-conversion process for the physical channel, and transmitting the physical channel.

In accordance with another exemplary aspect of the present invention, there is provided an apparatus for receiving channel quality information feedback and performing scheduling in a base station of a wireless communication system based on Orthogonal Frequency Division Multiple Access (OFDMA), comprising a channel quality information receiver for receiving, demodulating, and decoding channel quality information received from a mobile station, a controller for extracting average channel quality information for a total band and sub-band index information mapped to best channel quality of a particular mobile station on a basis of information from the channel quality information receiver, allocating a channel to each mobile station in adaptive modulation and demodulation mode using sub-band indices mapped to the best channel quality and a priority of each mobile station after collecting scheduling information, and performing scheduling using average channel quality information of mobile stations for which allocation is impossible with respect to a sub-band of the best channel quality or only the average channel quality information for the total band; and a data channel configuration unit for configuring and transmitting a data channel on a basis of information controlled in the controller.

In accordance with another exemplary aspect of the present invention, there is provided a method for feeding back channel quality information from a mobile station in a wireless communication system based on Orthogonal Frequency Division Multiple Access (OFDMA), comprising measuring sub-band-by-sub-band channel quality information and transmitting channel-by-channel quality information of a number of channels in order of sub-bands with better channel quality information and measuring and transmitting average channel quality information for a total band in the OFDMA wireless communication system.

In accordance with yet another exemplary aspect of the present invention, there is provided a scheduling method for use in a base station of a wireless communication system based on Orthogonal Frequency Division Multiple Access (OFDMA) for measuring and feeding back channel quality information of sub-bands with better channel quality information and average channel quality information for a total band, comprising determining whether an associated sub-band can be allocated to an associated mobile station when channel quality information for sub-bands is comprised, setting a data transmission in adaptive modulation and demodulation mode and setting a data transmission rate according to the channel quality information, when the associated sub-band can be allocated and setting a data transmission in diversity mode and setting a data transmission rate according to average channel quality information for a total band, when the associated sub-band cannot be allocated.

BRIEF DESCRIPTION OF THE DRAWINGS

The above and other objects, features and advantages of the present invention will be more clearly understood from the following detailed description taken in conjunction with the accompanying drawings, in which:

FIG. 1A illustrates an example of allocating orthogonal frequency resources to users in a mobile communication system based on Orthogonal Frequency Division Multiple Access (OFDMA);

FIG. 1B illustrates another example of allocating orthogonal frequency resources to users in the mobile communication system based on OFDMA;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will be described in detail herein below with reference to the accompanying drawings. It is to be understood that the phraseology and terminology employed herein are for the purpose of description and should not be regarded as limiting.

In a channel quality information feedback method proposed in an exemplary embodiment of the present invention, a mobile station (MS) feeds back two types of channel quality information. The two types of channel quality information proposed in the exemplary embodiments are sub-band-by-sub-band channel quality information and average channel quality information for a total band. In an exemplary scheduling method of a base station (BS), the BS uses the sub-band-by-sub-band channel quality information for an Adaptive Modulation & Coding (AMC) transmission and allocates a diversity channel using the channel quality information for the total band when a sub-band mapped to the channel quality information fed back from the MS cannot be allocated. Further, the BS uses the channel quality information for the total band to control power of a control channel.

Figure 2:
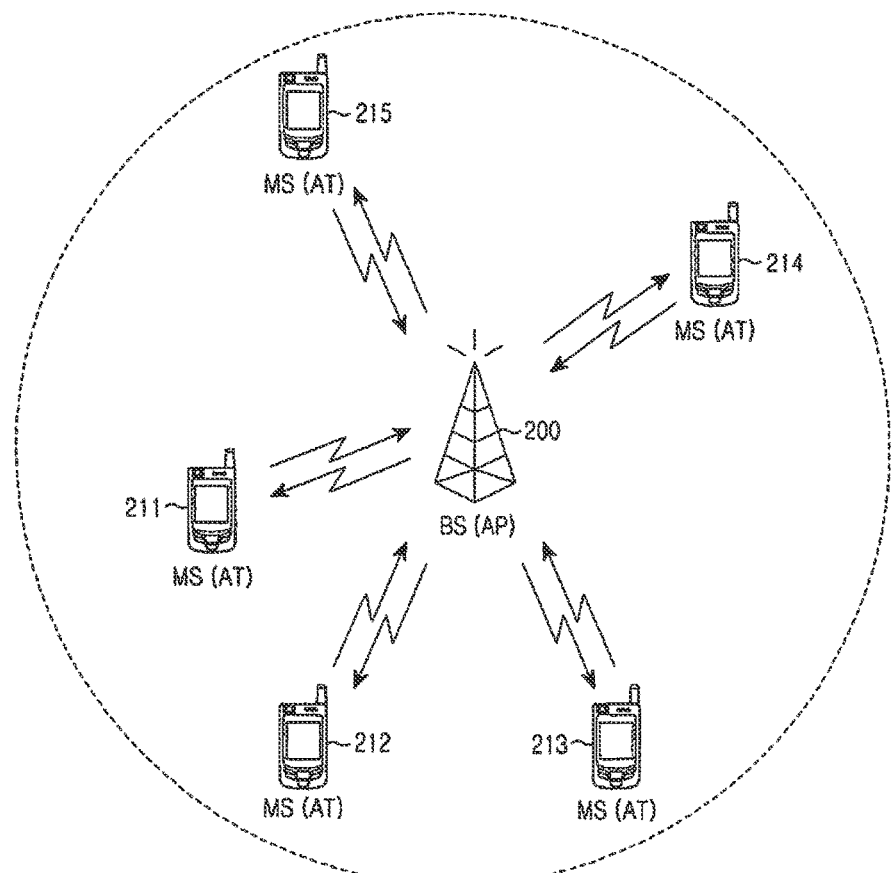
FIG. 2 is a conceptual diagram illustrating a relation between a base station (BS) and mobile stations (MSs) in a wireless communication system for performing packet data communication.
Figure 3:
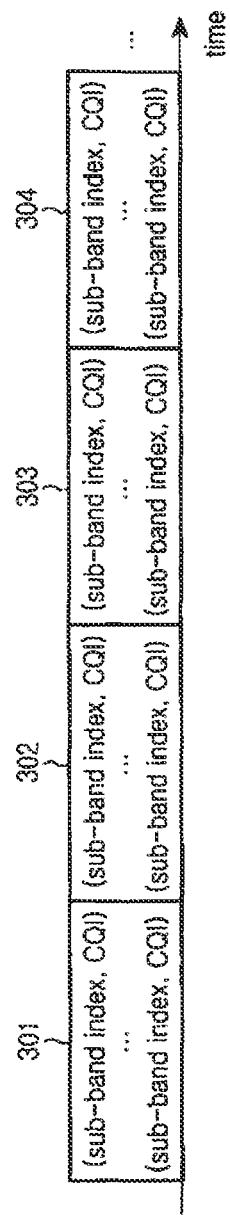
FIG. 3 is a timing diagram illustrating an operation for feeding back forward channel quality information from an MS in the OFDMA mobile communication system for performing packet data communication.
Figure 4:
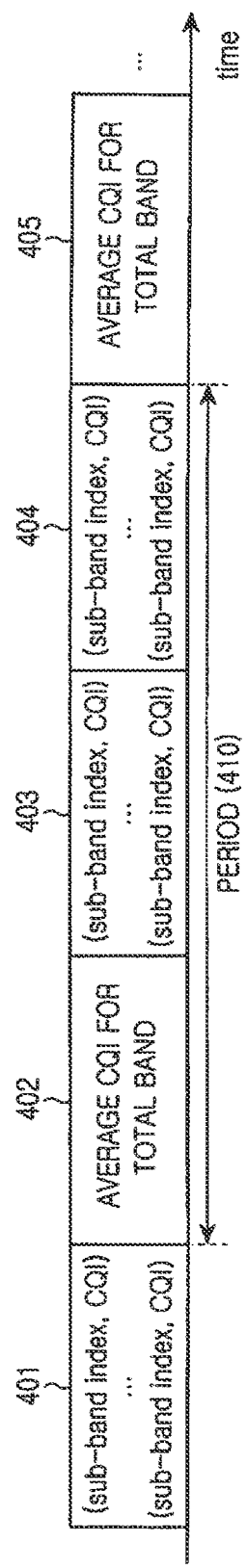
FIG. 4 is a timing diagram at the time of feeding back forward channel quality information from an MS in accordance with an exemplary embodiment of the present invention.

FIG. 4 is a timing diagram at the time of feeding back forward channel quality information from an MS in accordance with an exemplary embodiment of the present invention. The feedback of forward channel quality information of the MS will be described with reference to FIG. 4.

The MS transmits forward channel quality information in a block unit as illustrated in FIG. 4.

Blocks 401, 403, and 404 are mapped to intervals in which sub-band-by-sub-band channel quality information is fed back from the MS. Each of the blocks 401, 403, and 404 transmit a pair of a sub-band index and channel quality information. Thus, each of the band-by-band information transmission blocks 401, 403, and 404 indicate channel quality of a sub-band. When the band-by-band information transmission blocks 401, 403, and 404 are transmitted in respective intervals or slots, a sub-band index can be omitted if sub-band information to be fed back is set, previously or otherwise, between the BS and the MS. In an exemplary embodiment, the number of sub-bands is set by negotiation between the BS and the MS when the MS feeds back the band-by-band information transmission blocks 401, 403, and 404.

In FIG. 4, reference numerals 402 and 405 each denote an interval or slot for feeding back, from the MS, channel quality information for a total band rather than a sub-band. That is, the total-band channel quality information transmission blocks 402 and 405 are included. Now, the total-band channel quality information transmission blocks 402 and 405 will be described.

As described with reference to the prior art, a CQI stands for a "channel quality indicator" and indicates channel quality information. Thus, the channel quality information for the total band is average channel information for the total band. For example, when a system uses a band of 10 MHz, the MS measures an average signal-to-noise ratio (SNR) for the band of 10 MHz used in the system. An average value is taken by accumulating measured values during a time period. The average value is transmitted through the total-band channel quality information transmission blocks 402 and 405. This average value for the total band is not constantly used but is used only if needed. Thus, one of the total-band channel quality information transmission blocks 402 and 405 can be conventionally transmitted in a unit of a time period 410. That is, the period 410 in which one of the total-band channel quality information transmission blocks 402 and 405 are transmitted is a period in which the average channel quality information for the total band is transmitted. The period 410 can be set by negotiation between the BS and the MS. For example, if the period is 1, it means that an associated MS constantly transmits the average channel quality information for the total band without feeding back the sub-band-by-sub-band channel quality information. If the period is 2, it means that an associated MS alternately transmits the sub-band-by-sub-band channel quality information and the average channel quality information for the total band. FIG. 4 illustrates the case where the period is 3. In other exemplary embodiments, the average channel quality information for the total band can be transmitted periodically or aperiodically.

Figure 5:
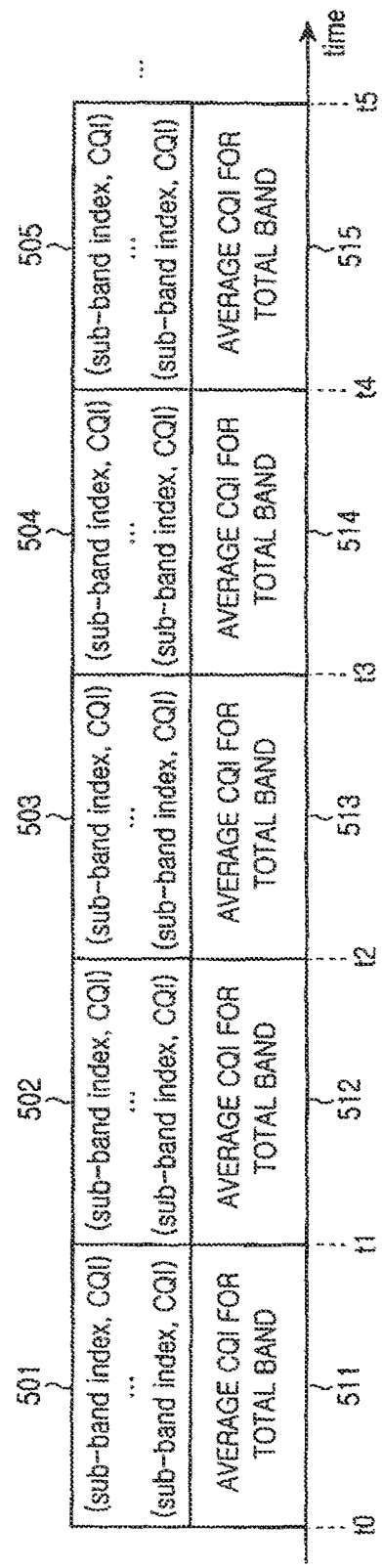
FIG. 5 is a timing diagram at the time of feeding back forward channel quality information from an MS in accordance with another exemplary embodiment of the present invention.

FIG. 5 is a timing diagram at the time of feeding back forward channel quality information from an MS in accordance with another exemplary embodiment of the present invention. An exemplary forward channel quality information feedback will be described with reference to FIG. 5.

In FIG. 5, blocks 501, 502, 503, 504, and 505 are mapped to intervals or slots in which the MS feeds back sub-band-by-sub-band channel quality information. Blocks 511, 512, 513, 514, and 515 are mapped to intervals or slots in which the MS feeds back channel quality information for a total band. In the example of FIG. 5, different from FIG. 4, an average CQI for the total band, sub-band indices mapped to a set number of best CQIs, and their CQI values are transmitted whenever the channel quality information is transmitted. When CQIs are not transmitted through several best sub-bands at a particular point of time, a CQI for the total band is transmitted.

Because best CQIs are transmitted together with their sub-band information in the example of FIG. 5, the BS can employ the remaining CQI values to compute an average value by excluding CQI values mapped to the best sub-bands from CQI values mapped to all sub-bands. For example, it is assumed that the total number of sub-bands is 10 and the MS transmits CQIs of two best sub-bands. Then, the two sub-bands have a value of more than the average value. Thus, a method can be employed which takes an average value of 8 sub-bands. That is, the BS excludes CQI values of the two sub-bands from CQI values of the 10 sub-bands, and takes an average value of the remaining sub-bands from which the highest values have been excluded. When the sub-band of the best CQI requested by the MS cannot be used in the above-described method, the average CQI value of the remaining sub-bands can be correctly detected by employing an average CQI value for the total band and an average CQI value of the best sub-bands reported by the MS. Scheduling can be performed using a correct CQI value of the remaining sub-bands. The above-described process can be computed in the BS. Alternatively, the MS can be configured to report an average of the remaining sub-bands from which the best sub-bands corresponding to the individually reported sub-bands are excluded. It is obvious that an average can be computed from which sub-bands to be individually reported are excluded when the method is performed in the MS.

There will be briefly described the reason why one MS feeds back two types of channel quality information, in other words, sub-band-by-sub-band channel quality information and average channel quality information for the total band, as in the exemplary embodiments of FIGS. 4 and 5. When receiving the feedback of the two types of channel quality information, the BS uses the sub-band-by-sub-band channel quality information for an AMC transmission. If the BS cannot allocate a sub-band mapped to the fed-back channel quality information to the MS, a diversity channel is allocated using other channel quality information, in other words, average channel quality information for a total band. Further, the BS uses the average channel quality information for the total band to control power of a control channel. This operation of the BS will be described in detail later with reference to FIG. 8.

It should be noted that an exemplary embodiment in which one MS transmits both the sub-band-by-sub-band channel quality information and the average channel quality information for the total band is not limited to FIG. 4 or 5, but can be variously modified.

Figure 6:
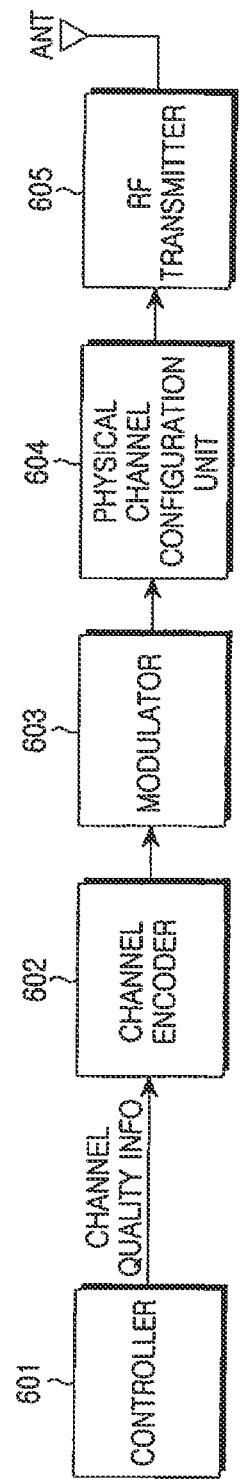
FIG. 6 is a block diagram illustrating a transmitter of an MS for transmitting channel quality information in accordance with an exemplary embodiment of the present invention.

FIG. 6 is a block diagram illustrating a transmitter of an MS for transmitting channel quality information in accordance with an exemplary embodiment of the present invention. The structure and operation of the transmitter of the MS for transmitting the channel quality information in accordance with an exemplary embodiment of the present invention will be described with reference to FIG. 6.

A controller 601 measures sub-band-by-sub-band or orthogonal frequency-by-orthogonal frequency channel quality information through a radio frequency (RF) unit or a demodulator and decoder (not illustrated in FIG. 6). The controller 601 generates channel quality information from measured values input thereto as illustrated in FIG. 4 or 5. The generated channel quality information is input to a channel encoder 602. The channel encoder 602 performs a channel encoding process for the input channel quality information and inputs the channel-encoded channel quality information to a modulator 603. The modulator 603 modulates the channel quality information in a set modulation scheme and then inputs the modulated channel quality information to a physical channel configuration unit 604. The encoder 602 and modulator 603 may be contained in a modem (not shown). The physical channel configuration unit 604 inserts the channel quality information into a physical channel allocated in the reverse direction in an OFDMA system and then outputs the physical channel to an RF transmitter 605. Then, the RF transmitter 605 performs a band up-conversion process for the channel quality information and then transmits the channel quality information in the reverse direction through an antenna ANT.

Figure 7:
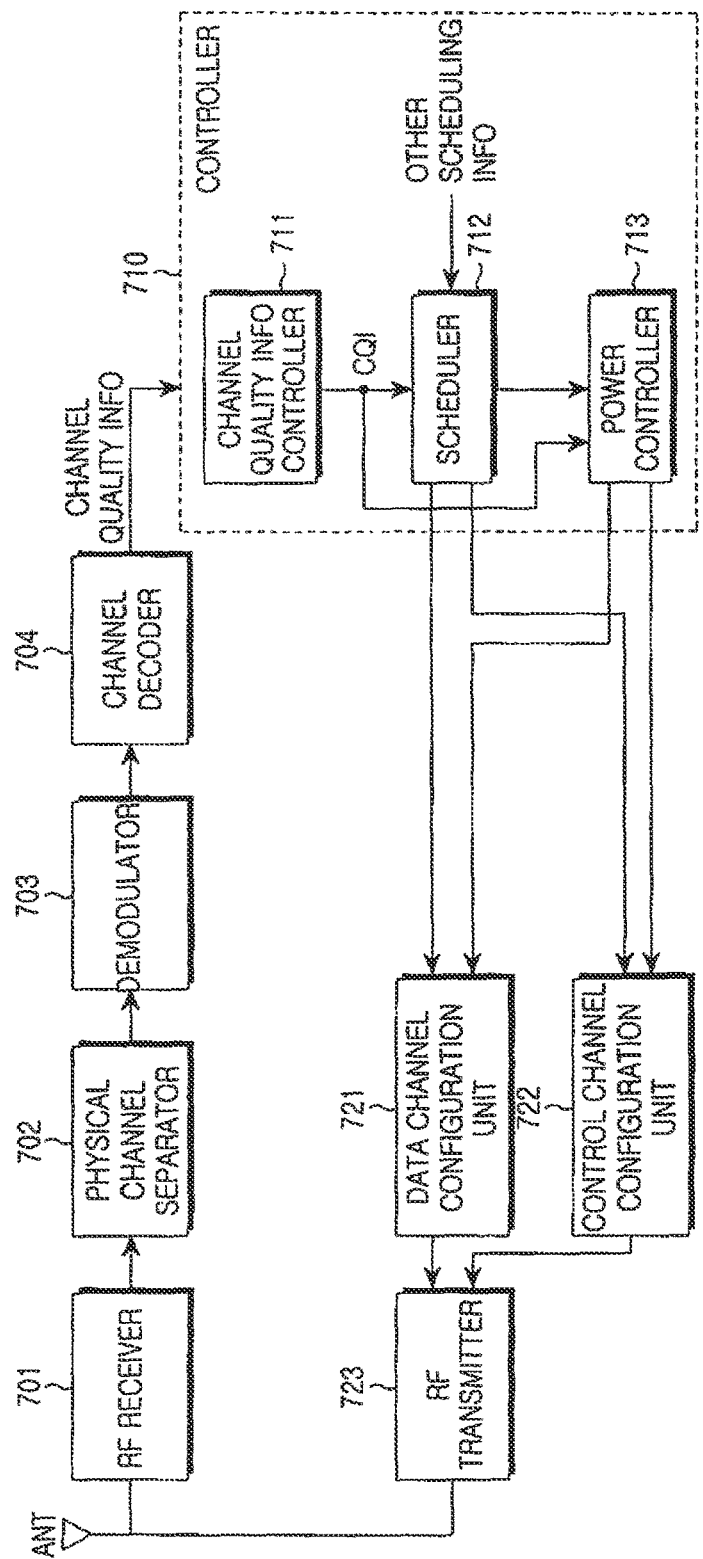
FIG. 7 is a block diagram illustrating a BS for receiving channel quality information and performing scheduling and power control in accordance with an exemplary embodiment of the present invention.

FIG. 7 is a block diagram illustrating a BS for receiving channel quality information and performing scheduling and power control in accordance with an exemplary embodiment of the present invention. The internal structure and operation of the BS in accordance with an exemplary embodiment of the present invention will be described with reference to FIG. 7.

An RF receiver 701 of the BS of FIG. 7 receives a reverse signal through an antenna ANT. The RF receiver 701 down-converts the received signal and then inputs the down-converted signal to a physical channel separator 702. The physical channel separator 702 separates CQI information and then inputs the separated CQI information to a demodulator 703. Of course, the physical channel separator 702 extracts other control information and reverse data. Only contents relating to the present invention will be described. The demodulator 703 demodulates the CQI information in a defined scheme and then inputs the demodulated CQI information to a channel decoder 704. Then, the channel decoder 704 extracts the CQI information as described with reference to FIG. 4 or 5 through a channel decoding process. The extracted channel quality information is input to a controller 710. The controller 710 includes a channel quality information controller 711, a scheduler 712, and a power controller 713. The channel quality information controller 711 receives the channel quality information and classifies band-by-band CQI information and total-band channel quality information. For example, when the channel quality information is received, average CQI information for the total band is kept during the period 410 as illustrated in FIG. 4 and is provided to the scheduler 712 or/and the power controller 713. Further, when the channel quality information as illustrated in FIG. 5 is received, the average CQI information for the total band and the band-by-band channel quality information are classified and are provided to the scheduler 712 or/and the power controller 713. As described above, when the average CQI for the total band includes an individually reported average value and individually reported sub-band CQIs are excluded, the channel quality information controller 711 computes an average value by excluding individually reported band values from the average CQI for the total band. Information computed by the channel quality information controller 711 is provided to the scheduler 712 or/and the power controller 713. The scheduler 712 performs scheduling using the CQI information input from the channel quality information controller 711 and other scheduling information. This scheduling process will be described in detail with reference to FIG. 8. The scheduler 712 performs the scheduling using the above-described information and then provides a scheduling result to a data channel configuration unit 721 such that a data channel is configured. The scheduling result of the scheduler 712 is input to a control channel configuration unit 722 such that packet data control information mapped to the scheduling result can be transmitted. Further, the scheduling result is input to the power controller 713.

Further, the power controller 713 receives CQI information scheduled by the scheduler 712 and performs power control for the data channel configuration unit 721. At this time, the power controller 713 controls power of a data transmission of the AMC mode using the sub-band-by-sub-band channel quality information when a data channel transmission is an AMC transmission. On the other hand, when the data channel transmission is the diversity transmission, the power controller 713 performs power control using the average channel quality information for the total band among the channel quality information received from the channel quality information controller 711. At this time, the average channel quality information for the total band can use CQIs from which a best CQI value is excluded as described above.

Further, the power controller 713 performs power control for the control channel configuration unit 722. In this case, when the control channel transmission is the AMC transmission, power control for a control channel transmission of the AMC mode is performed using the sub-band-by-sub-band channel quality information. In contrast, when the control channel transmission is the diversity transmission, the power controller 713 performs power control using the average channel quality information for the total band among channel quality information received from the channel quality information controller 711.

The data channel configuration unit 721 sets transmission power using information of the power controller 713, generates data to be transmitted to each MS, and outputs the generated data to an RF transmitter 723. Further, the control channel configuration unit 722 configures a control signal to be transmitted to each MS or all MSs in a control channel, receives information of transmission power for a signal to be transmitted to each MS from the power controller 713, and outputs the transmission power information to the RF transmitter 723. The configured information is configured in a physical channel. The RF transmitter 723 transmits the physical channel to each MS through the antenna ANT after a band up-conversion process.

Figure 8:
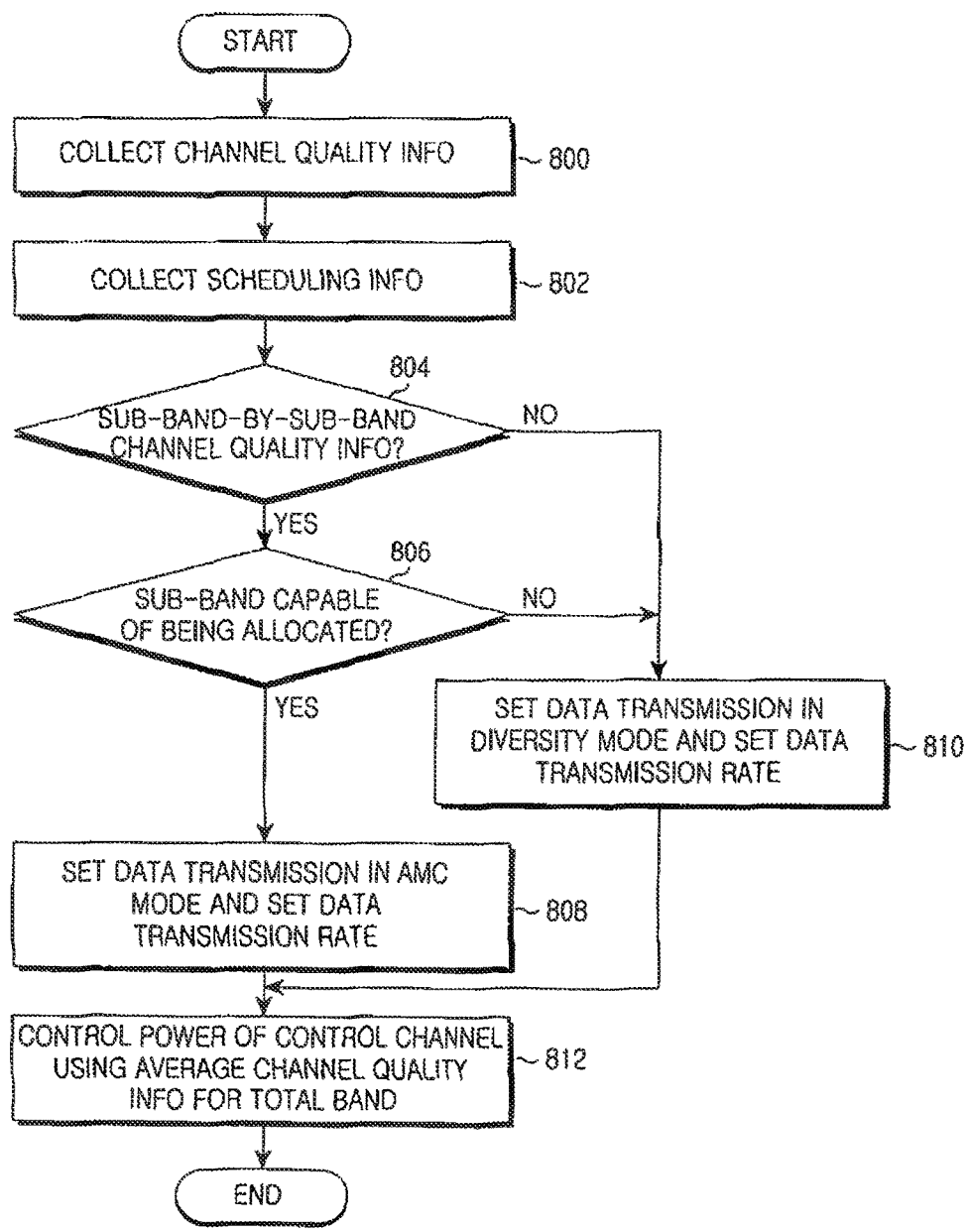
FIG. 8 is a flowchart illustrating a control operation at the time of allocating a packet data channel from a BS using channel quality information in accordance with an exemplary embodiment of the present invention.

FIG. 8 is a flowchart illustrating a control operation at the time of allocating a packet data channel from the BS using channel quality information in accordance with an exemplary embodiment of the present invention. The control operation of the BS will be described with reference to FIG. 8 when the packet data channel is allocated using the channel quality information in accordance with an exemplary embodiment of the present invention. The case where channel quality information is fed back and used will be described.

The scheduler 712 of the BS collects available channel quality information, in other words, sub-band-by-sub-band channel quality information and average channel quality information for a total band in step 800. In this information collection, the channel quality information controller 711 receives channel quality information from each MS and provides the received channel quality information to the scheduler 712. When collecting the channel quality information, the scheduler 712 collects information, for example, a state of a buffer containing data to be transmitted to each MS and Quality of Service (QoS) information in step 802. Then, the scheduler 712 determines whether the channel quality information received from a particular MS includes the sub-band-by-sub-band channel quality information when a channel is allocated to the particular MS in step 804. If it is determined that the sub-band-by-sub-band channel quality information is included, the scheduler 712 proceeds to step 806. Otherwise, the scheduler 712 proceeds to step 810. First, the case where the scheduler 712 proceeds to step 806 will be described.

When proceeding to step 806, the scheduler 712 determines whether a sub-band mapped to the sub-band-by-sub-band channel quality information can be allocated to the MS. The scheduler 712 determines whether the sub-band requested by the MS has been already allocated to a different user with a priority. An order of forward data transmissions to all MSs is set according to a priority of each MS and a type of service in steps 804 and 806.

If the associated sub-band can be allocated to the MS, in other words, the user, as the determination result of step 806, the scheduler 712 proceeds to step 808. When proceeding to step 808, the scheduler 712 decides to allocate the sub-band to the MS. That is, the scheduler 712 decides to transmit data in the AMC transmission mode and sets a data transmission rate of the AMC transmission mode using channel quality information for the associated sub-band. However, if the associated sub-band cannot be allocated to the user, in other words, the associated sub-band has been already allocated to a different user, as the determination result of step 806, the scheduler 712 proceeds to step 810. The process of step 810 will be described.

If the channel quality information received from the MS is not included in the sub-band-by-sub-band channel quality information as the determination result of step 804, the scheduler 712 proceeds to step 810 to decide to transmit data to the MS in the diversity transmission mode. Thus, the scheduler 712 sets a data transmission rate of the diversity transmission using the average channel quality information for the total band received from the MS in step 810.

The process of steps 804 and 806 is performed for each MS. If the process is completed, in other words, the decision in step 810 or 808 is completed for all MSs, the scheduler 712 proceeds to step 812. When proceeding to step 812, the scheduler 712 provides the power controller 713 with sub-band information of the MS for transmitting data in the AMC mode and provides the power controller 713 with sub-band information of the MS for transmitting data in the diversity mode.

The power controller 713 generates a power control signal of a control channel using information received from the scheduler 712 and the channel quality information controller 711 and then provides the generated power control signal to the control channel configuration unit 722. Further, the power controller 713 generates a power control signal for data to be transmitted in the AMC mode and then provides the generated power control signal to the data channel configuration unit 721. That is, after configuring the data channel of the AMC transmission mode or the data channel of the diversity transmission mode, the BS configures the control channel for transmitting control information for the data channel and performs power control of the control channel using the average channel quality information for the total band received from each MS. The above-described process is performed in a unit of packet data transmission.

As is apparent from the above description, exemplary embodiments of the present invention can minimize the forward performance degradation due to a decrease in an amount of reverse channel quality information through a scheduling method and a power control method. Further, exemplary embodiments of the present invention can effectively suppress an increase in the reverse load due to channel quality information feedback, and can increase the overall system capacity.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their total scope of equivalents.

What is claimed is:

1. A method for transmitting a channel quality indicator (CQI) in a wireless communication system, the method comprising:
    obtaining, at a mobile station, a first CQI for an entire frequency band, the entire frequency band including a plurality of sub-bands;
    obtaining, at the mobile station, a second CQI for each of the plurality of sub-bands; and
    transmitting, by the mobile station, the first CQI and at least one second CQI in a same transmission time interval,
    wherein the plurality of sub-bands are configured between a base station and the mobile station, and
    wherein the first CQI is a CQI for the entire frequency band.

2. The method of claim 1, further comprising:
    before the transmitting of the first CQI and the at least one second CQI, encoding the first CQI and the at least one second CQI;
    modulating the encoded first CQI and the at least one second CQI based on a modulation scheme; and
    mapping the modulated first CQI and the at least one second CQI on an allocated physical channel.

3. The method of claim 1, wherein the first CQI and the at least one second CQI are obtained based on a predetermined reference signal from the base station.

4. The method of claim 1, wherein the first CQI and the at least one second CQI are transmitted in an aperiodic report.

5. The method of claim 1, wherein the first CQI and the at least one second CQI are transmitted in a periodic report.

6. A method for receiving a channel quality indicator (CQI) in a wireless communication system, the method comprising:
    receiving, at a base station, a first CQI for an entire frequency band, the entire frequency band including a plurality of sub-bands; and
    receiving, at the base station, a second CQI for each of the plurality of sub-bands,
    wherein the first CQI and at least one of the second CQI are received at the base station in a same transmission time interval from a mobile station,
    wherein the plurality of sub-bands are configured between the base station and the mobile station, and
    wherein the first CQI is a CQI for the entire frequency band.

7. The method of claim 6,
wherein, by the mobile station, the first CQI and the at least one second CQI are encoded, the encoded first CQI and the at least one second CQI are modulated based on a modulation scheme, and the modulated first CQI and the at least one second CQI are mapped on an allocated physical channel.

8. The method of claim 6, wherein the first CQI and the at least one second CQI are obtained, by the mobile station, based on a predetermined reference signal from the base station.

9. The method of claim 6, wherein the first CQI and the at least one second CQI are received in an aperiodic report.

10. The method of claim 6, wherein the first CQI and the at least one second CQI are received in a periodic report.

11. An apparatus for transmitting a channel quality indicator (CQI) in a wireless communication system, the apparatus comprising:
at least one processor configured to:
obtain a first CQI for an entire frequency band, the entire frequency band including a plurality of sub-bands, and
obtain a second CQI for each of the plurality of sub-bands; and
a transmitter configured to transmit the first CQI and at least one of the second CQI in a same transmission time interval,
wherein the plurality of sub-bands are configured between a base station and the apparatus, and
wherein the first CQI is a CQI for the entire frequency band.

12. The apparatus of claim 11, further comprising:
an encoder configured to encode the first CQI and the at least one second CQI before the transmitting of the first CQI and the at least one second CQI;
a modulator configured to modulate the encoded first CQI and the at least one second CQI based on a modulation scheme; and
a mapper configured to map the modulated first CQI and the at least one second CQI on an allocated physical channel.

13. The apparatus of claim 11, wherein the first CQI and the at least one second CQI are obtained based on a predetermined reference signal from the base station.

14. The apparatus of claim 11, wherein the first CQI and the at least one second CQI are transmitted in an aperiodic report.

15. The apparatus of claim 11, wherein the first CQI and the at least one second CQI are transmitted in a periodic report.

16. An apparatus for receiving a channel quality indicator (CQI) in a wireless communication system, the apparatus comprising:
a receiver; and
at least one processor configured to:
control the receiver to receive a first CQI for an entire frequency band, the entire frequency band including a plurality of sub-bands, and
control the receiver to receive a second CQI for each of the plurality of sub-bands,
wherein the first CQI and at least one of the second CQI are received in a same transmission time interval from a mobile station,
wherein the plurality of sub-bands are configured between the apparatus and the mobile station, and
wherein the first CQI is a CQI for the entire frequency band.

17. The apparatus of claim 16,
wherein, by the mobile station, the first CQI and the at least one second CQI are encoded,
wherein the encoded first CQI and the at least one second CQI are modulated based on a modulation scheme, and
wherein the modulated first CQI and the at least one second CQI are mapped on an allocated physical channel.

18. The apparatus of claim 16, wherein the first CQI and the at least one second CQI are obtained, by the mobile station, based on a predetermined reference signal from the apparatus.

19. The apparatus of claim 16, wherein the first CQI and the at least one second CQI are received in an aperiodic report.

20. The apparatus of claim 16, wherein the first CQI and the at least one second CQI are received in a periodic report.

* * * * *